US009503465B2

United States Patent
Coskun

(10) Patent No.: US 9,503,465 B2
(45) Date of Patent: Nov. 22, 2016

(54) METHODS AND APPARATUS TO IDENTIFY MALICIOUS ACTIVITY IN A NETWORK

(71) Applicant: AT&T Intellectual Property I, L.P., Atlanta, GA (US)

(72) Inventor: Baris Coskun, Weehawken, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 14/080,532

(22) Filed: Nov. 14, 2013

(65) Prior Publication Data

US 2015/0135320 A1    May 14, 2015

(51) Int. Cl.
*G06F 21/50* (2013.01)
*H04L 29/06* (2006.01)

(52) U.S. Cl.
CPC ....... *H04L 63/1425* (2013.01); *H04L 63/0254* (2013.01)

(58) Field of Classification Search
CPC ....................................................... G06F 21/50
USPC .......................................................... 726/24
See application file for complete search history.

(56) References Cited

U.S. PATENT DOCUMENTS

| | | |
|---|---|---|
| 7,260,846 B2 | 8/2007 | Day |
| 7,475,426 B2 | 1/2009 | Copeland, III |
| 7,760,653 B2 | 7/2010 | Poletto |
| 7,826,458 B2 | 11/2010 | Rowell et al. |
| 7,890,612 B2 | 2/2011 | Todd et al. |
| 8,181,247 B1 | 5/2012 | Pavlyushchik et al. |
| 8,245,302 B2 * | 8/2012 | Evans .................. G06F 21/577 726/22 |
| 8,285,658 B1 * | 10/2012 | Kellas-Dicks et al. ......... 706/20 |
| 8,332,944 B2 | 12/2012 | Rozenberg et al. |

(Continued)

FOREIGN PATENT DOCUMENTS

| | | |
|---|---|---|
| AU | 2006315555 A1 | 5/2007 |
| CN | 102739647 A | 10/2012 |

(Continued)

OTHER PUBLICATIONS

Stolfo et al., "Data Mining-based Intrusion Detectors: An Overview of the Columbia IDS Project," Sep. 9, 2001, 10 pages, Columbia University, Georgia Institute of Technology, Florida Institute of Technology.

(Continued)

*Primary Examiner* — William Powers
(74) *Attorney, Agent, or Firm* — Hanley, Flight & Zimmerman, LLC

(57) ABSTRACT

Methods, apparatus, systems and articles of manufacture are disclosed to learn malicious activity. An example method includes assigning weights of a distance function to respective statistical features; iteratively calculating, with a processor, the distance function to adjust the weights (1) to cause a reduction in a first distance calculated according to the distance function for a first pair of entities in a reference group associated with malicious activity and (2) to cause an increase in a second distance calculated according to the distance function for a first one of the entities included in the reference group and a second entity not included in the reference group; and determining whether a first statistical feature is indicative of malicious activity based on a respective adjusted weight of the first statistical feature determined after calculating the distance function for a number of iterations.

18 Claims, 13 Drawing Sheets

(56) References Cited

U.S. PATENT DOCUMENTS

| | | |
|---|---|---|
| 8,438,241 B2 | 5/2013 | Bar et al. |
| 8,483,056 B2 | 7/2013 | Chen et al. |
| 8,504,681 B1 | 8/2013 | Cooper et al. |
| 8,544,087 B1* | 9/2013 | Eskin et al. ............... 726/22 |
| 2004/0193943 A1* | 9/2004 | Angelino et al. ........... 714/4 |
| 2006/0026679 A1 | 2/2006 | Zakas |
| 2007/0011745 A1 | 1/2007 | Mitomo et al. |
| 2007/0240220 A1* | 10/2007 | Tuvell ............... G06F 21/56 726/24 |
| 2009/0024549 A1* | 1/2009 | Johnson ..................... 706/46 |
| 2009/0222924 A1 | 9/2009 | Droz et al. |
| 2009/0234876 A1* | 9/2009 | Schigel et al. ............ 707/102 |
| 2010/0071061 A1 | 3/2010 | Crovella et al. |
| 2010/0153316 A1 | 6/2010 | Duffield et al. |
| 2010/0306847 A1 | 12/2010 | Lambert et al. |
| 2011/0317566 A1 | 12/2011 | Keeni |
| 2012/0216282 A1 | 8/2012 | Pappu et al. |
| 2013/0167230 A1 | 6/2013 | Etchegoyen |
| 2015/0058982 A1* | 2/2015 | Eskin et al. ............... 726/23 |
| 2015/0067845 A1* | 3/2015 | Chari et al. ............... 726/23 |

FOREIGN PATENT DOCUMENTS

| | | |
|---|---|---|
| WO | 2010105843 A1 | 9/2010 |
| WO | 2012015485 A1 | 2/2012 |
| WO | 2013014672 A1 | 1/2013 |
| WO | 2013030594 A1 | 3/2013 |

OTHER PUBLICATIONS

Edelman, "Possibilities of OpenFlow/SDN Applications," Jan. 23, 2012, 3 pages, Jason Edelman's Blog.

Sinclair et al, "An Application of Machine Learning to Network Intrusion Detection," received Sep. 26, 2013, 7 pages, The University of Texas at Austin.

* cited by examiner

| Record ID | V | LOCAL ID | REMOTE ID | DIRECTION | PROTOCOL | PACKETS | BYTES |
|---|---|---|---|---|---|---|---|
| 1 | 1 | 001 | 020 | OUTGOING | TCP | 10 | 1600 |
| 2 | 1 | 007 | 041 | INCOMING | UDP | 3 | 2400 |
| 3 | 1 | 001 | 020 | OUTGOING | TCP | 5 | 4000 |
| 4 | 1 | 010 | 022 | OUTGOING | TCP | 20 | 3200 |
| 5 | 1 | 304 | 052 | INCOMING | TCP | 12 | 960 |
| 6 | 1 | 001 | 033 | INCOMING | UDP | 2 | 1600 |
| ... | ... | ... | ... | ... | ... | ... | ... |
| N | 1 | --- | --- | --- | --- | --- | --- |

FIG. 3

| Record ID | V | LOCAL ID | REMOTE ID | DIRECTION | PROTOCOL | NUMBER OF PACKETS | NUMBER OF BYTES |
|---|---|---|---|---|---|---|---|
| 1 | 1 | 001 | 020 | OUTGOING | TCP | 10 | 1600 |
| 3 | 1 | 001 | 020 | OUTGOING | TCP | 5 | 4000 |
| 6 | 1 | 001 | 033 | INCOMING | UDP | 2 | 1600 |
| 2 | 1 | 007 | 041 | INCOMING | UDP | 3 | 2400 |
| 4 | 1 | 010 | 022 | OUTGOING | TCP | 20 | 3200 |
| 5 | 1 | 304 | 052 | INCOMING | TCP | 12 | 960 |
| ... | ... | ... | ... | ... | ... | ... | ... |
| N | 1 | --- | --- | --- | --- | --- | --- |

FIG. 5

| Record ID | V | LOCAL ID | REMOTE ID | DIRECTION | PROTOCOL | PACKETS | BYTES |
|---|---|---|---|---|---|---|---|
| 1 | 1 | 001 | 020 | OUTGOING | TCP | 10 | 1600 |
| 3 | 1 | 001 | 020 | OUTGOING | TCP | 5 | 4000 |
| 6 | 1 | 001 | 033 | INCOMING | UDP | 2 | 1600 |

| LOCAL ID | NUMBER OF RECORDS | TOTAL PACKETS | TOTAL BYTES | NUMBER OF REMOTE IDS | | |
|---|---|---|---|---|---|---|
| 001 | 3 | 17 | 7200 | 2 | | |
| 007 | $X_{007}$ | $P_{007}$ | $B_{007}$ | $R_{007}$ | | |
| 010 | $X_{010}$ | $P_{010}$ | $B_{010}$ | $R_{010}$ | | |
| ... | ... | ... | ... | ... | | |
| N | $X_N$ | $P_N$ | $B_N$ | $R_N$ | | |

FIG. 6

METHODS AND APPARATUS TO IDENTIFY MALICIOUS ACTIVITY IN A NETWORK

FIELD OF THE DISCLOSURE

This disclosure relates generally to network monitoring, and, more particularly, to identifying malicious behavior in a network from network log records.

BACKGROUND

In communication networks, communication between entities may be tracked and stored in network log records. A network log record stores information corresponding to network communications. Such information may include an identity of the entities participating in a network communication (e.g., a communication session), a protocol type of the network communication, a direction of the network communication, an amount of data or type of data exchanged in the network communication, and/or any other information that can be identified in a network communication.

At times malicious entities access a communication network to perform malicious activities to compromise the communication network. The malicious entities may be one or more of a host, a mobile device, a server, a domain, etc. Such malicious activities may attempt to halt communication, control communication, manipulate other entities in the network, seize confidential information (e.g., personal and/or financial information) from other entities in the network, etc.

BRIEF DESCRIPTION OF THE DRAWINGS

FIG. 3 illustrates an example network log including example log records that are analyzed by the example log record analyzer of FIGS. 1 and/or 2.

FIG. 5 is a representation of an example aggregated network log generated by the example log record analyzer of FIG. 4.

FIG. 6 is a representation of example overall aggregate features generated and calculated by the example log record analyzer of FIGS. 1, 2, and/or 4 from the example aggregated network log of FIG. 5.

DETAILED DESCRIPTION

Figure 1:
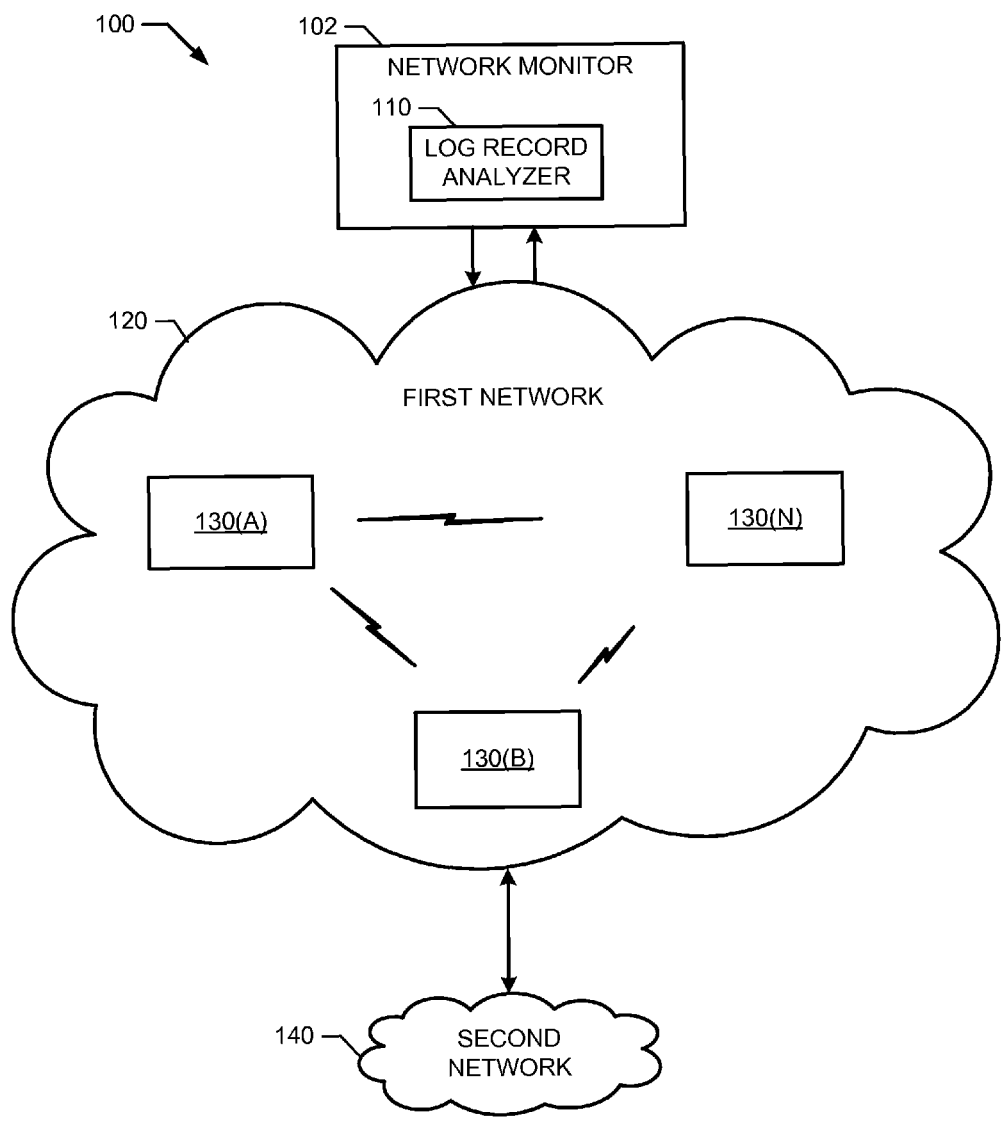
FIG. 1 illustrates an example communication environment with an example network monitor including an example log record analyzer.

Example methods, apparatus, and articles of manufacture (e.g., storage media) disclosed herein involve generating features from network log records of a communication network (e.g., a local area network (LAN), a wide area network (WAN), a cellular network, etc.) and identifying which (if any) of the features are indicative of malicious behavior. In examples disclosed herein, a distance function is used to indicate which features, which may be representative of network activity and/or network activity type are (1) similar among malicious entities and (2) different between malicious entities and other entities of the network.

Examples disclosed herein involve automatically identifying and/or learning distinguishing features of known malicious entities from raw network log records. In examples disclosed herein, a distance function is developed to identify features that are indicative of malicious activity based on respective weight values calculated after several iterations of the distance function. Examples disclosed herein allow network monitors to gain initial insight into characteristics of suspected malicious entities and allow for prompt, accurate detection of malicious activities. Though examples disclosed herein may refer to particular types of networks (e.g., IP networks, mobile networks utilizing SMS), examples disclosed herein may be applied to any type of communication network.

Examples disclosed herein involve assigning weights of a distance function to respective statistical features. In some such examples, the distance function calculates a distance (e.g., a difference) between a pair of entities in a network based on respective calculated values of the statistical features corresponding to the pair of entities. Some examples involve iteratively calculating, with a processor, the distance function for a number of iterations to iteratively adjust the weights to cause (1) a reduction in a first distance calculated according to the distance function for a first pair of entities in a reference group associated with malicious activity and (2) an increase in a second distance calculated according to the distance function for a first one of the entities included in the reference group and a second entity not included in the reference group. Furthermore, examples disclosed herein involve determining whether a first statistical feature is indicative of malicious activity based on a respective adjusted weight of the first statistical feature determined after calculating the distance function for the number of iterations.

Some examples disclosed herein involve parsing network log records into fields based on communication information in the network logs, determining categories of the fields based on the communication information in the respective fields, and generating the statistical features from the network log records based on the categories of the fields.

As disclosed herein, reference entities (e.g., hosts, mobile phones, servers, domains, etc.) can be network entities that have been identified as malicious or potentially malicious using any of various mechanisms. For example, a network monitor may deem an entity as malicious based on communication with known malicious Internet Protocol (IP)

addresses or domain names listed on a public blacklist. As another example, a list of phone numbers in a mobile network may be deemed malicious based on reports from other users of the mobile network identifying phone numbers associated with senders of unsolicited short message service (SMS) messages. In some examples, entities may be deemed malicious by determining that the entities have feature values that are relatively similar to feature values of malicious activity, and the feature values are for one or more features determined to be indicative of malicious activity. Prior techniques to identify underlying malicious behavior involve a manual analysis of the malicious entities and/or network log records of the malicious entities. Examples disclosed herein automate identification of particular network activities of the malicious entities that are similar to one another but different from other entities in the network by extracting features representative of the network activities from raw network log records (e.g., network flow records, firewall logs, call detail records, etc.).

A feature accessed from a log may be representative of network activity and/or type(s) of network activity. In some examples, a feature is generated from network log records based on network communications (e.g., protocol types, data size, data type, communication direction, etc.). Accordingly, a feature may be considered to quantify network activity by providing a numerical value representation of one or more overall aspects of network activity (e.g., a total number of network communications, a total number of communication partners, a total amount of data transmitted, etc.), a numerical value associated with one or more particular types of the network activity (e.g., an amount of data transmitted via TCP protocol, an amount of data received via UDP protocol, etc.), and/or a ratio of any of the above (e.g., an amount of data transmitted and/or received per network communication, etc.).

FIG. 1 illustrates an example communication environment 100 with an example network monitor 102 including an example log record analyzer 110 constructed in accordance with the teachings of this disclosure. In the illustrated example of FIG. 1, the network monitor 102 monitors and controls communication in an example first network 120. The example first network 120 may be a LAN, a WAN, a cellular network, etc. and/or any other type(s) and/or combination of networks. The example first network includes a plurality of entities 130(A), 130(B), . . . , 130(N), where (N) may correspond to the number of entities in the communication network 100 and the entity 130(N) represents a single entity or multiple entities. The example entities 130(A), 130(B), . . . , 130(N) may be one or more of a host, a mobile device (e.g., a cellular phone, tablet personal computer, an e-reader, etc.), a personal computer, a laptop computer, a server, a domain, a router, a base station, etc. The example entities 130(A), 130(B), . . . , 130(N) of FIG. 1 communicate with devices in a second network 140 (e.g., the Internet, or other network outside of the first network 120, etc.). One or more of the entities 130(A), 130(B), . . . , 130(N) may be suspected malicious entities and/or classified as malicious entities. In some examples disclosed herein, the entities 130(A), 130(B), . . . , 130(N) of the first network 120 are referred to as elements and/or entities in a set N. Furthermore, in some examples disclosed herein, the entities 130(A), 130(B), . . . , 130(N) that are suspected of being malicious entities are referred to as elements and/or entities in a set S and the entities 130(A), 130(B), . . . , 130(N) that are not considered malicious are referred to as elements and/or entities in a set R.

In the illustrated example of FIG. 1, the example network monitor 102 analyzes network communications that occur over the first network 120. As used herein, a network communication is any communication that passes data from one or more of the entities 130(A), 130(B), . . . , 130(N) to another of the one or more entities 130(A), 130(B), . . . , 130(N), or vice versa. In the illustrated example, the network monitor 102 maintains a network log record database (see FIG. 2) that stores information corresponding to the network communications of the entities 130(A), 130(B), . . . , 130(N) in network log records (see FIG. 3). The example log record analyzer 110 analyzes the network log records to identify features that are indicative of malicious activity.

Figure 2:
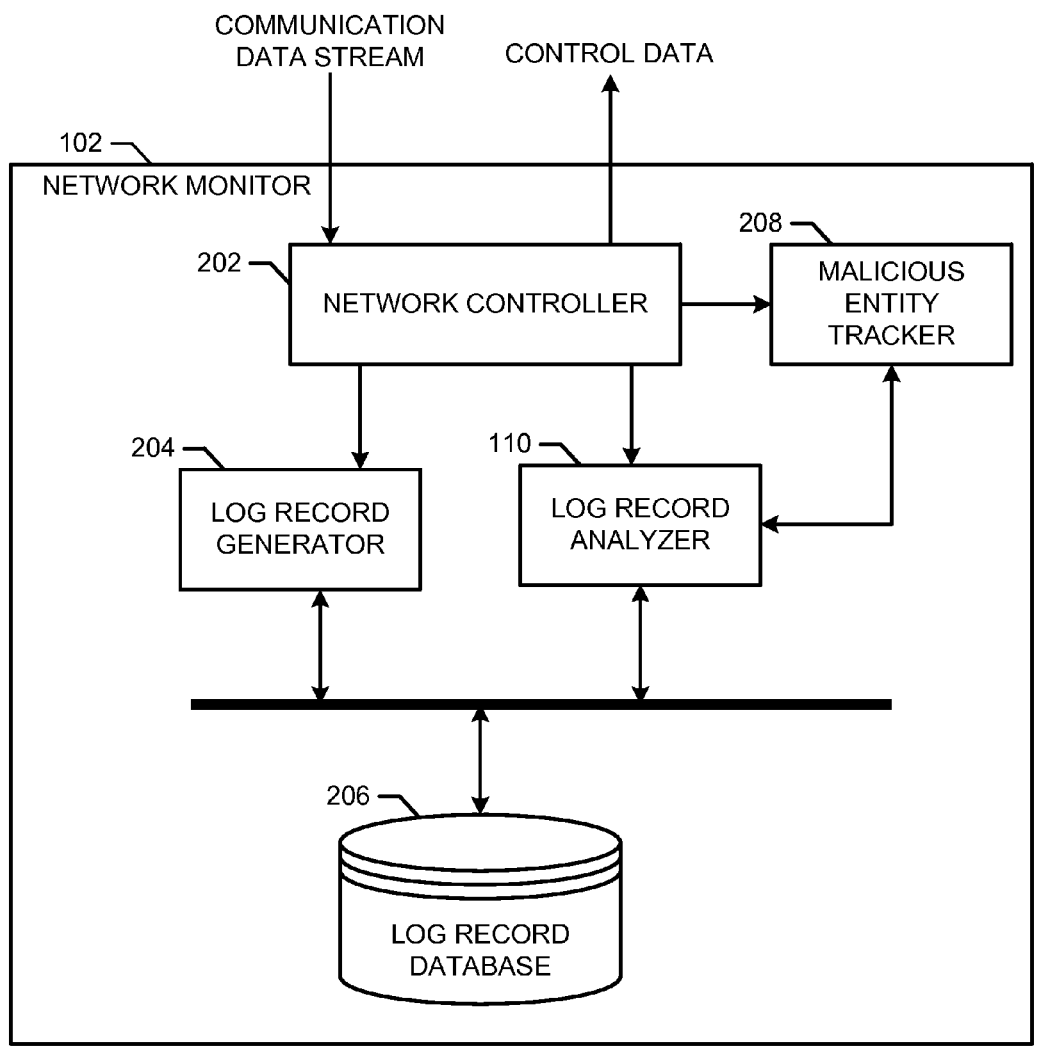
FIG. 2 is a block diagram of an example implementation of the example network monitor of FIG. 1 constructed in accordance with the teachings of this disclosure.

FIG. 2 is a block diagram of an example implementation of the example network monitor 102 of FIG. 1 constructed in accordance with the teachings of this disclosure. The example network monitor 102 of FIG. 2 includes an example network controller 202, an example log record generator 204, an example log record database 206, an example malicious entity tracker 208 and the example log record analyzer 110. In the illustrated example of FIG. 2, the example network controller 202 retrieves communication data from the first network 120. For example, the network controller 202 may monitor the network communications involving the entities 130(A), 130(B), . . . , 130(N) and/or involving the entities 130(A), 130(B), . . . , 130(N) and the second network 140. In some examples, the network monitor 102 is implemented by one or more routers, edge routers, access points, and/or base stations, etc. of the first network 120.

In the illustrated example of FIG. 2, the example network controller 202 uses the example log record analyzer 110 to monitor the first network 120. In some examples, the example network controller 202 uses information received from the log record analyzer 110 to identify malicious activities and/or malicious entities in the first network 120. In examples disclosed herein, the example log record analyzer 110 identifies features that are indicative of malicious activity by analyzing network log records (see FIG. 3 described below) of suspected malicious entities and/or unclassified entities using a distance calculation analysis. In some examples, upon receiving identified features indicative of malicious activity, the example network controller 202 may further analyze unclassified entities in the network 120 to determine whether they are malicious based on having similar features as the suspected malicious entities. For example, the network controller 202 may obtain, for an unclassified entity, a value for a feature that is indicative of malicious activity, and based on that value being within a threshold (e.g., within a certain percentage) of a respective feature value calculated for a suspected malicious entity, the network controller 202 may deem the unclassified entity as malicious. In such examples, the newly identified malicious entity may be tracked in the malicious entity tracker 208.

The example network controller 202 of FIG. 2 provides the communication data from the network communications to the example log record generator 204, which generates network log records for the communication data. The log record generator 204 stores the network log records in the log record database 206. The log record analyzer 110 may retrieve the network log records from the log record database to analyze the log records to identify features indicative of malicious activity.

FIG. 3 illustrates an example network log 300 including example network log records 301 that may be generated by the network monitor 102 and analyzed by the example log record analyzer 110 of FIG. 2. The example network log records 301 may be flow records, call detail records, and/or any other type of log records suitably generated for a particular network. In some examples, the network log 300 employs a general structure that may be generated using any suitable technique. In such examples, the general structure of the network log 300 provides for a same set of fields for each of the log records 301, and each field corresponds to one of a set of categories (e.g., such as type, identity, counter, etc.). For example, the set of fields may include a type field (e.g., protocol, direction, etc.), an identity field (local ID, remote ID, etc.), a counter field (e.g., numerical fields identifying an amount of data exchanged), etc. In other examples, the network log records 301 may be customized for a particular network and/or log record analyzer 110.

In the illustrated example of FIG. 3, the network log records 301 include an example record identifier (ID) field 302, an example bit identifier field 303, an example local ID field 304, an example remote ID field 306, an example direction field 308, an example protocol field 310, an example number of packets field 312, and an example number of bytes field 314. The example network log records 301 may additionally or alternatively include other fields identifying other corresponding information (e.g., data type, external/internal communication, etc.) from network communications that may be useful in detecting malicious activity and/or detecting and generating features corresponding to malicious activity.

In the illustrated example of FIG. 3, the example record ID 302 is an identifier that identifies the network log records 301. The example bit identifier field 303 is a bit identifier (e.g., having a value 1) to be used to calculate a number of records (e.g., by summing the bits) that is appended to the network log records 301 by the log record analyzer 110 and/or the log record generator 204. The example local ID field 304 of the network log records 301 identifies the entities 130(A), 130(B), . . . , 130(N) monitored within the network 120 for the corresponding record. The example remote ID field 304 denotes whether an entity is inside or outside of the first network 120 (e.g., a device in the second network 140) that is a communication partner with the entity corresponding to the respective local ID field 304. The example direction field 308 identifies a direction of the communication (e.g., incoming/outgoing) relative to the local ID field 304. The example protocol field 310 of the illustrated example identifies a protocol of the network communication recorded in the respective network log record 301. The example packets field 312 and bytes field 314 indicate a number of packets and a number of bytes, respectively, of data transmitted and/or received during the respective network communication. In examples disclosed herein, the network log records 301 are provided to the log record analyzer 110 for analysis to identify features from the network log records 301 that are indicative of malicious activity in accordance with the teachings of this disclosure.

Returning to FIG. 2, the example malicious entity tracker 208 monitors and/or tracks the entities 130(A), 130(B), . . . , 130(N) suspected of being malicious. For example, if a first entity 130(A) interacts with known malicious Internet Protocol (IP) addresses or domain names listed on a public blacklist, the first entity 130(A) may be deemed to be malicious. As another example, to identify suspected malicious entities, the first entity 130(A) may be reported to the network monitor 102 by a second entity 130(B) when the first entity 130(A) maliciously engages with the second entity 130(B) (e.g., by sending unsolicited short message service (SMS) messages). In such examples, when an entity is deemed malicious, the network controller 202 instructs the malicious entity tracker 208 to store an identifier (e.g., a corresponding local ID field 302, such as an IP address, a telephone number, a domain name, etc.) in the malicious entity tracker 208. In some examples, the network controller 202 updates the malicious entity tracker 208 upon identification of an entity having similar features as a known malicious entity. For example, the network monitor 102 may identify a respective statistical feature value corresponding to a statistical feature identified by the log record analyzer 110 for an unclassified entity in the network 120. The example network monitor 102 may then compare the respective statistical feature value to a corresponding statistical feature value calculated for a malicious entity by the log record analyzer 110. Based on the comparison, the example network monitor 102 determines the unclassified entity is malicious if, for example, the respective statistical feature value of the statistical feature for the unclassified entity is within a threshold (e.g., within a percentage, such as 10%, 20%, etc.) of the statistical feature value of the malicious entity.

While an example manner of implementing the network monitor 102 of FIG. 1 is illustrated in FIG. 2, one or more of the elements, processes and/or devices illustrated in FIG. 2 may be combined, divided, re-arranged, omitted, eliminated and/or implemented in any other way. Further, the example log record analyzer 110, the example network controller 202, the example log record generator 204, the example log record database 206 and/or, more generally, the example network monitor 102 of FIG. 2 may be implemented by hardware, software, firmware and/or any combination of hardware, software and/or firmware. Thus, for example, any of the example log record analyzer 110, the example network controller 202, the example log record generator 204, the example log record database 206 and/or, more generally, the example network monitor 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, log record analyzer 110, the example network controller 202, the example log record generator 204, and/or the example log record database 206 is/are hereby expressly defined to include a tangible computer readable storage device or storage disk such as a memory, a digital versatile disk (DVD), a compact disk (CD), a Blu-ray disk, etc. storing the software and/or firmware. Further still, the example network monitor 102 of FIG. 2 may include one or more elements, processes and/or devices in addition to, or instead of, those illustrated in FIG. 2, and/or may include more than one of any or all of the illustrated elements, processes and devices.

Figure 4:
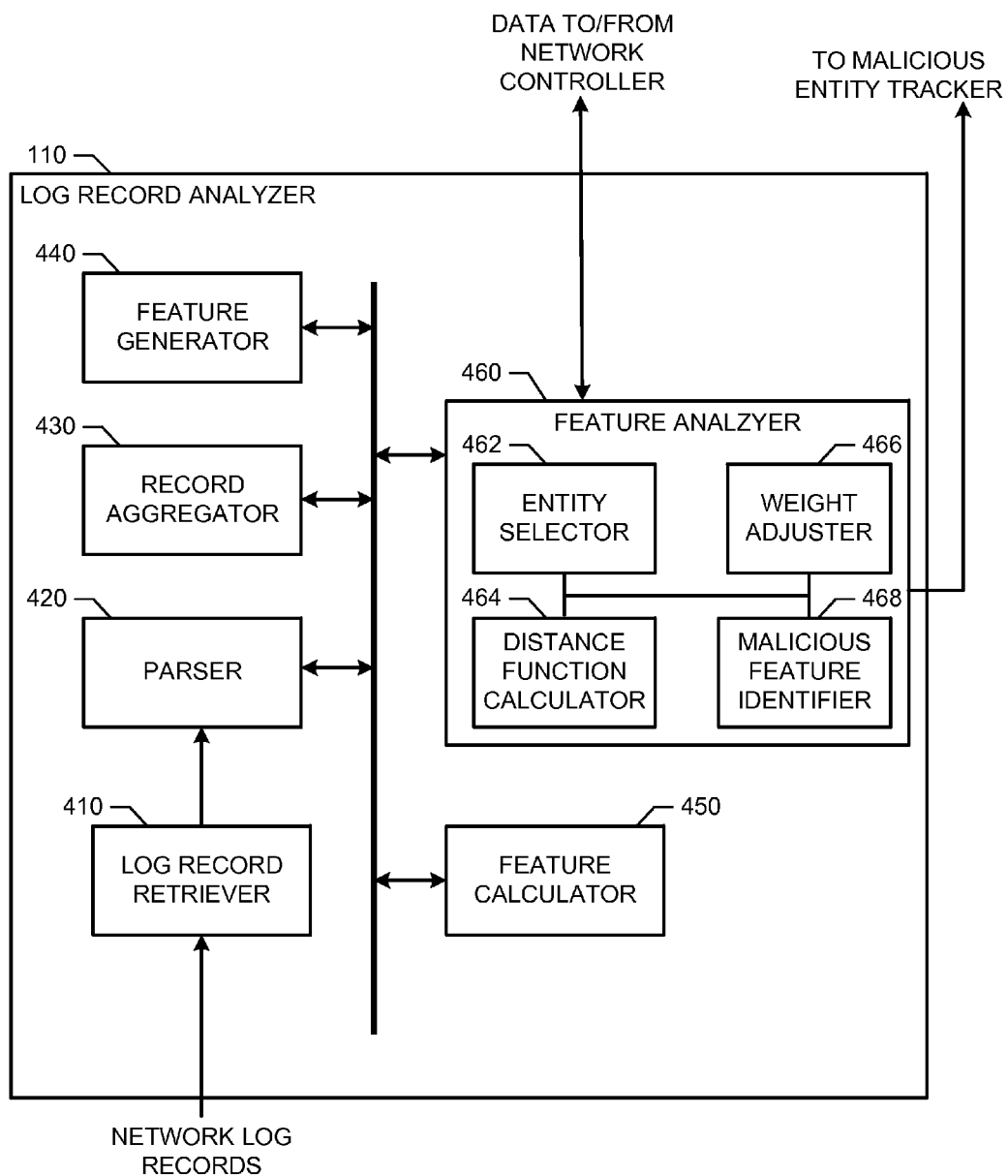
FIG. 4 is a block diagram of an example implementation of the example log record analyzer of FIGS. 1 and/or 2.

FIG. 4 is a block diagram of an example implementation of the example log record analyzer 110 of FIGS. 1 and/or 2. The example log record analyzer 110 of FIG. 4 includes an example log record retriever 410, an example parser 420, an example record aggregator 430, an example feature generator 440, an example feature calculator 450, and an example feature analyzer 460. In the illustrated example of FIG. 4, the example feature analyzer 460 includes an example entity selector 462, an example function calculator 464, an example weight adjuster 466, and an example malicious feature identifier 468. The example log record analyzer 110 of FIG. 4 automatically determines features of network log records, such as the network log records 301, that distinguish known malicious entities from unclassified entities in the network 120 using a distance function analysis that iteratively calculates a distance (e.g., a difference between features values and/or feature vector values of respective entities).

The example log record retriever 410 of FIG. 4 retrieves network log records, such as the network log records 301, from the log record database 206. In some examples, the example log retriever 410 retrieves the log records 301 in response to a user input received by the network monitor 102 requesting analysis of the log records 301 to identify features indicative of malicious activity. In some examples, the log record retriever 410 may retrieve the network log records 301 periodically or aperiodically based on settings of the network monitor 102 and/or the network controller 202.

The example parser 420 of FIG. 4 parses the received network logs 301. In the illustrated example, the parser 420 identifies fields (e.g., the fields 302-314) of the retrieved network log records 301. The example parser 420 identifies an owner entity field (e.g., the local ID field 302 or other field identifying an entity for which the log record was generated) and a category (e.g., type, identity, counter, etc.) for each identified field of the network log records 301. For example, the parser 420 may use parsing instructions that identify field categories of particular data. For example, Table 1 illustrates example parsing instructions that may be implemented by the parser 420 to identify field categories in the network log records 301.

TABLE 1

| Field | Category |
| --- | --- |
| Local ID | Owner |
| Remote ID | Identity |
| Direction | Type {Incoming, Outgoing} |
| Protocol | Type {TCP, UDP} |
| NumPackets | Counter |
| NumBytes | Counter |

As disclosed herein, a type field holds a categorical variable which takes one of a few discrete values (e.g., incoming/outgoing, TCP/UDP, etc.). The example type field signifies a particular type of network communication represented in the network log record 301. For example, the direction field 308 is a type field indicating whether the type of communication is incoming or outgoing to the owner entity or from the owner entity, respectively. As another example, the protocol field 310 is a type field indicating whether a network flow is a UDP or a TCP communication. In examples disclosed herein, an identity field holds a categorical variable that indicates an identity of the network entities 130(A), 130(B), ..., 130(N) and could have many different types of values (as opposed to a few for a type field). For example, the remote ID field 306 of the example network log records 301 is an identity field. In another example for mobile network (e.g., cellular network) implementations, a serving base station field of a call detail record of a mobile network may be considered an identity field. In examples disclosed herein, a counter field contains numerical information about a network communication. For example, the bit identifier 303, the packets field 312, and/or the bytes field 314 may be identified as counter fields.

The example record aggregator 430 of FIG. 4 aggregates the network log records 301 based on owner entity to generate aggregated network log records 500, an example of which is shown in FIG. 5. Accordingly, the record aggregator 430 identifies a particular owner identity (e.g., from the local ID field 304) and analyzes one or more of the network log records of an entity of the network corresponding to that particular owner identity. In some examples, the record aggregator 430 temporarily stores (e.g., in a buffer of the record aggregator 430) the network log records 500 sorted by owner entity for calculation of feature values for the respective owner entities. In some such examples, the example feature calculator 450 may then retrieve the aggregated network log records 500 for calculation of network features. In other examples, the record aggregator 430 retrieves network log records including a particular owner identity (e.g., local ID "001" in the network log records 502) and forwards the network log records to the feature calculator 450.

The example feature generator 440 of FIG. 4 determines features of the network log records 301. Features generated by the feature generator 440 may be referred to as statistical features. Such example features generated by the feature generator 440 statistically summarize network activities and/or network communications performed by the entities 103(A), 130(B), ... 130(N). In the illustrated example, the feature generator 440 identifies the particular category (e.g., type, identity, counter, etc.) of each field. The example feature generator 440 of FIG. 4 generates features based on the categories of the fields of the network log records 301.

In the illustrated example of FIG. 6, the feature generator 440 generates a first tier of overall aggregate features 600 as shown in FIG. 6. The example overall aggregate features are generated by identifying counter fields (e.g., the bit indicator field 303, the packets field 312 and/or the bytes field 314) and identity fields (e.g., the remote ID field 306). In the illustrated example of FIG. 6, the feature generator 440 sums each counter field and identifies a number of unique values in each identity field of network log records for a given entity (e.g., the owner entity corresponding to local ID "001"). Accordingly, in the illustrated example of FIG. 6, the feature generator 440 generates a NUMBER OF RECORDS feature 602 using the bit identifier field 303, a TOTAL PACKETS feature 604 from the packets field 312, a TOTAL BYTES feature 606 from the bytes field 314, and a NUMBER OF REMOTE IDS feature 608 from the remote ID field 306.

Accordingly, the NUMBER OF RECORDS feature 602 of FIG. 6 corresponds to the number of network communications involving an owner entity (e.g., "3" records 502 for the entity corresponding to local ID "001"). The example TOTAL PACKETS feature 604 corresponds to a total number of packets sent and/or received by the owner entity (e.g., "17" total packets were sent and/or received by the entity corresponding to local ID "001" in FIG. 6). The example TOTAL BYTES feature 606 corresponds to a total amount of data (in bytes) sent and/or received by the owner entity (e.g., "7200" bytes were sent and/or received by the entity corresponding to local ID "001"). Furthermore, the NUMBER OF REMOTE IDS feature 608 corresponds to the number of different entities that the owner entity communicated with outside of the first network (e.g., the entity corresponding to local ID "001" communicated with "2" unique remote IDs (i.e., "020" and "033")). Though not shown, other overall aggregate features may be generated in the first tier of features corresponding to any other counter and/or identity fields that may be included in other network log records.

Figure 7:
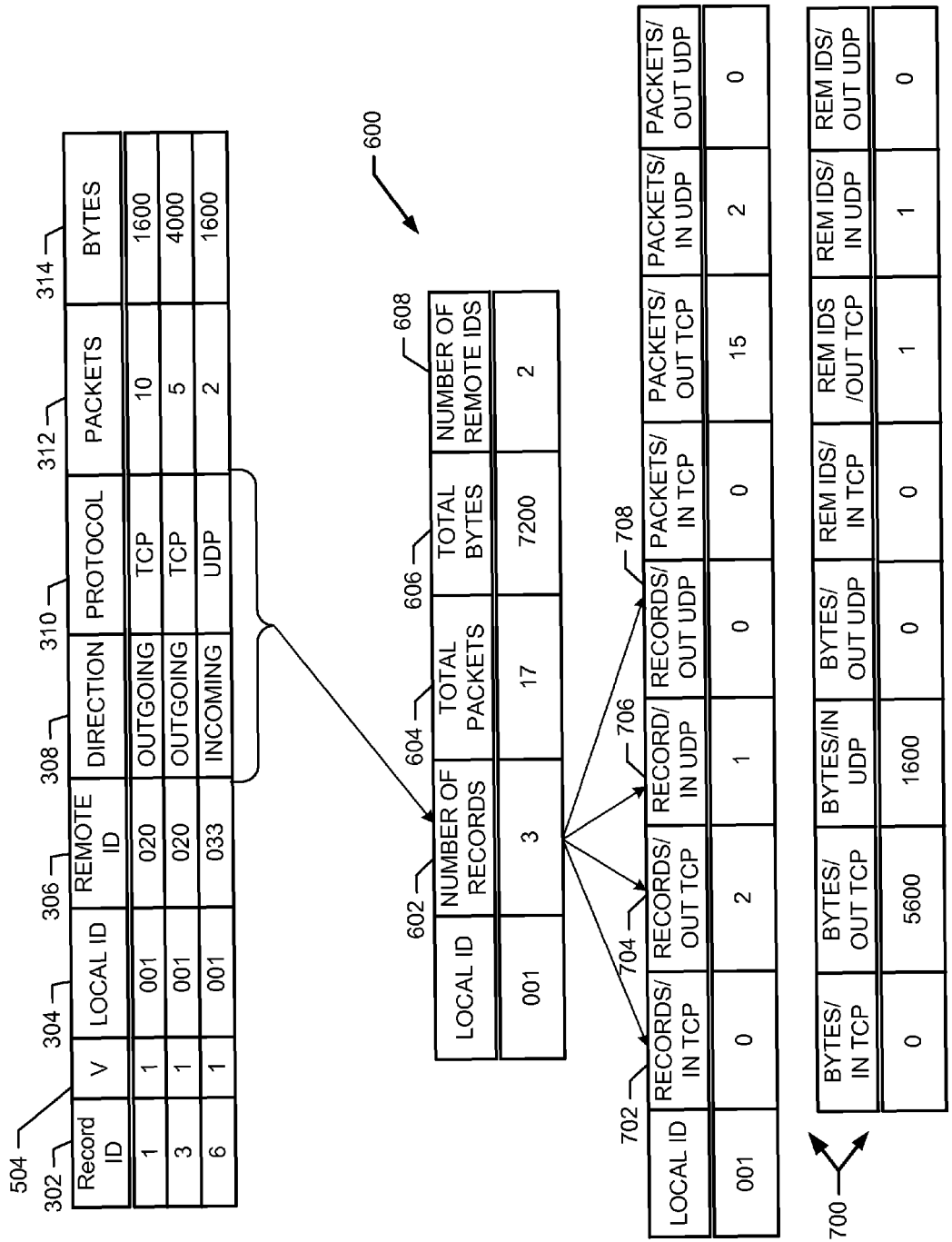
FIG. 7 is a representation of example per-type aggregate features generated and calculated by the example log record analyzer of FIGS. 1, 2, and/or 4 from the example overall aggregate features of FIG. 6.

In some examples, the feature generator 440 of FIG. 4 generates an example second tier of aggregate features, such as the example per-type aggregate features 700 as shown in FIG. 7. The example feature generator 440 generates the per-type aggregate features 700 from the network log records 301 and the overall aggregate features 600. In the illustrated example of FIG. 7, the example feature generator 440 identifies the overall aggregate features 600 and determines the per-type aggregate features 700 corresponding to each of the overall aggregate features 600 and each type field (e.g., the direction field 308, the protocol field 310, etc.). In the illustrated example, the feature generator 440 computes the per-type features 700 by computing each possible configuration of type field for each overall aggregate feature 600. However, less than all possible configurations are computed for some or all of the overall aggregate features in some examples. In FIG. 6, there are four type combinations corresponding to incoming TCP, outgoing TCP, incoming UDP, and outgoing UDP. Accordingly, in FIG. 7, for a NUMBER OF RECORDS feature 602, four corresponding per-type features are generated: (1) incoming TCP records 702 (2) outgoing TCP records 704, (3) incoming UDP records 706, and (4) outgoing UDP records 708. Similar methods are used to compute other corresponding per-type features 700 for the TOTAL PACKETS feature 604, the TOTAL BYTES feature 606, and the example NUMBER OF REMOTE IDS feature 608. Accordingly, a total of up to sixteen example per-type aggregate features 700 may be generated from the four overall aggregate features 600.

In some examples, the feature generator 440 generates an example third tier of example extended features using the overall aggregate features and the per-type aggregate features. With respect to the example extended features, the overall aggregate features and the per-type features may be referred to as base features. In some such examples, the feature generator 440 derives the example extended features from different combinations of the base features. For example the extended features may be generated by taking a ratio of different possible combinations (e.g., pairs) of the base features. For example, a first extended feature may be TOTAL PACKETS PER NUMBER OF RECORDS feature, which would be calculated by dividing the total number of packets received and/or transmitted by the total number of records for a particular entity.

The example third tier of extended features provides additional features (other than the base features) that the log record analyzer 110 may use to analyze malicious activity in the first network 120. Accordingly, using the examples of FIGS. 6 and 7, there are 20 base features that may yield a total of up to 190 example extended features $$\left( \text{calculated from the combination} \binom{20}{2} \right),$$

although fewer than the total number of extended features may be used. Therefore, in the illustrated examples disclosed herein, the feature generator 440 may generate 210 total features (190+16+4=210) from the network log records 301, which correspond to a total of the number of possible extended features plus 16 per-type aggregate features and 4 overall aggregate features. In some examples, the network log records 301 include several more fields that result in several thousands of features. In some examples, more tiers of features and/or different methods of generating the extended features may be implemented to expand the feature space to gather more data from the network log 300 for analyzing malicious activity.

In some examples, the feature generator 440 removes generated features based on a variance of the values calculated for the generated features (e.g., if all features values are equal to zero for all entities). For example, if all values of a particular feature are equal to zero, the feature may not be used in analyzing malicious network activity (e.g., by calculating one or more per-type features to yield values which would always be zero). As a more specific example, consider a TCP synchronization field is included in the network log 300 and the feature generator 440 generates a "number of bytes for UDP flows where TCP synchronization flag is TRUE." In this example, the feature value calculated by the feature calculator 450 would likely always be equal to zero for all entities because TCP flags are generally not set for UDP flows. Accordingly, in such examples, the example feature generator 440 may increase the efficiency of malicious activity analysis by avoiding unnecessary computations of features that do not provide useful analysis of the network log records 301.

The example feature calculator 450 of the illustrated example computes the values of the features for the entities identified by the record aggregator 430. In some examples, the feature calculator 450 calculates feature values for all entities and temporarily stores the feature values (e.g., in a buffer). In such examples, the feature calculator 450 may provide all feature values to the feature analyzer 460 for feature analysis. In some examples, the feature calculator 450 calculates feature values for all entities (e.g., the entities 130(A), 130(B), . . . , 130(N)) in response to a single instruction to calculate feature values for the features generated by the feature generator 440 from the network log records 301. In some examples, the feature calculator 450 calculates feature values for particular entities selected by the example feature analyzer 460 for feature analysis. Accordingly, in such examples, the feature calculator 450 calculates feature values in response to respective instructions from the feature analyzer 460.

The example feature analyzer 460 of FIG. 4 analyzes the determined features generated by the feature generator 440 and the respective values of the features calculated by the feature calculator 450 to identify features indicative of malicious activity. In the illustrated example of FIG. 4, the example entity selector 462 selects entities for analysis (e.g., a pair of suspected malicious entities identified by the malicious entity tracker 208, and an unclassified entity identified by the record aggregator 430). The example distance function calculator 464 calculates a distance between pairs of the selected entities based on values of statistical features identified for the selected entities using a distance function (e.g., a weighted Euclidean distance function). In some examples, the distance between the pairs of entities is representative of a difference between feature values and/or feature vector values of the respective entities. The example weight adjuster 466 of FIG. 4 iteratively adjusts weights (e.g., using stochastic gradient descent) of the distance function that correspond to the generated statistical features to determine which of the features are relatively more indicative of malicious activity. The example malicious feature identifier 468 analyzes the adjusted weights after the feature analyzer 460 has completed iteratively computing the distance function and adjusting the weights of the statistical features (e.g., adjusted weights having a greater value are more indicative of the respective features being malicious). The feature analyzer 460 learns a distance function and/or weights of a distance function corresponding to statistical features of network logs (e.g., the network logs 301) to determine which of the statistical features (e.g., the features 600, 700 of FIGS. 6 and 7, and/or corresponding extended features) are indicative of malicious activity.

In some examples, the feature analyzer 460 analyzes k features for the entities 130(A), 130(B), ..., 130(N) in the first network 120 of FIG. 1. In such examples, each of the entities 130(A), 130(B), ..., 130(N) has a k-dimensional vector value corresponding to the feature values. In some examples, the entity selector 462 selects entities (e.g., in pairs) for analysis using a random number generator. The example distance function calculator 464 iteratively calculates a distance (e.g., a feature vector value difference) between the selected entities using a distance function (e.g., a weighted Euclidean distance function) to identify which of the features (e.g., which ones of the example overall aggregate features 600, the example per-type aggregate features 700, and/or the example extended features) are indicative of malicious activity. The example weight adjuster 466 assigns weights ($w_i$) of the distance function for each generated feature i, which may be preprocessed to have zero mean and unit variance. During analysis of the features, the example weight adjuster 466 iteratively adjusts the weights ($w_i$) of the distance function (e.g., based on stochastic gradient descent), as disclosed herein, to distinguish suspected malicious entities in the first network 120 from other entities in the first network 120.

In examples disclosed herein, entities e (e.g., the entities 130(A), 130(B), ..., 130(N) are entities within a network N (e.g., the first network 120), such that e∈N. The example feature analyzer 460 of FIG. 4 identifies a reference set of suspected malicious entities S from the malicious entity tracker 208, such that S∈N. Further, the feature analyzer 460 identifies a remaining set of entities R (e.g., from the network log records 300 and/or from the record aggregator 430), such that R=N\S (i.e., S and R are mutually exclusive and collectively exhaustive subsets of N). Entities in the remaining set R are referred to herein as unclassified entities as they have not been identified as malicious (or non-malicious).

In examples disclosed herein, it is assumed that there are several more unclassified entities than suspected malicious entities such that S<<R, and that the network N is assumed to be mostly non-malicious. Thus, any small subset $\hat{R} \subset R$ is presumed to consist only of non-malicious entities with a high-probability (i.e., when |$\hat{R}$|<<|R|). Additionally, although the entities of S may be suspected to be malicious, some entities in S may be non-malicious. Accordingly, it is presumed that any subset $\hat{S} \subset S$ includes several (e.g., more than two) malicious entities with high probability. Using these sets of entities S and R, the example feature analyzer 440 seeks to identify a distance function (e.g., a weighted Euclidean distance function) that distinguishes entities in the set S from entities in the set R.

In some examples, the feature analyzer 460 uses the following example distance function:

$$d(\bar{x}, \bar{y}, \bar{w}) = \sum_{i=1}^{k} w_i (x_i - y_i)^2 \quad \text{Equation 1}$$

wherein, $\bar{x}$ and $\bar{y}$ are entities (e.g., the entities 130(A), 130(B), ..., 130(N)) represented as k—dimensional feature vectors, $\bar{w}$ is a parameter vector (i.e., $w_1$, $w_2$, $w_3$, ..., $w_k$), and $w_i$ is the weight associated with the $i^{th}$ feature. For example, the NUMBER OF RECORDS feature 602 of FIG. 6 may be identified by the feature analyzer 460 (and/or feature generator 440) as a first feature, and thus, $w_1$ is the weight corresponding to the NUMBER OF RECORDS feature 602. As another example, a RECORDS/IN TCP feature 702 (i.e., a number of records of incoming TCP communications) of FIG. 7 may be identified as a fifth feature, and thus, $w_5$ is the weight corresponding to the RECORDS/IN TCP feature 702, and so on for the features generated by the example feature generator 440. Example Equation 1 is a squared weighted Euclidean distance function. In some examples, the feature analyzer 460 uses one or more distance functions different from the illustrated example Euclidean distance function to analyze the network log records 301.

The example feature analyzer 460 of FIG. 4 identifies features that are indicative of malicious activity by learning (e.g., determining) a distance function (e.g., Equation 1) that would yield (1) small values between suspected entities (i.e., x, y∈S) and (2) large values between suspect entities and unclassified entities (i.e., x∈S and y∈R). The example distance function is learned by adjusting the weights $\bar{w}$ until final weights $\bar{w}^*$ of the distance function are identified to relatively minimize the following example objective function:

$$L(\hat{S}, \hat{R}, \bar{w}) = \min_{s,\bar{t} \in \hat{S}, s \neq \bar{t}} d(\bar{s}, \bar{t}, \bar{w}) - \min_{s \in \hat{S}, \bar{r} \in \hat{R}} d(\bar{s}, \bar{r}, \bar{w}) \quad \text{Equation 2}$$

wherein, the weights $w_i$ of the parameter vector $\bar{w}$ correspond to particular features. Accordingly, using Equation 2, the feature analyzer 460 determines a significance of the corresponding features i based on a value of the final weights $\bar{w}^*$ that distinguish the set of entities in S from the set of entities in R.

More specifically, in Equation 2, the first term (i.e., $\min_{\bar{s},\bar{t} \in \hat{S}, \bar{s} \neq \bar{t}} d(\bar{s}, \bar{t}, \bar{w})$) represents a relative minimum distance among all possible pairs of entities in a given subset of suspected malicious entities. As disclosed herein, a set of suspect entities S may include some non-malicious entities. Nevertheless, certain feature values indicate similarities between malicious entities. Accordingly, when analyzing a distance between respective pairs of entities in a set of suspected malicious entities, the relative minimum distance is likely to be between two malicious entities (e.g., s, t) in the suspected set (rather than between a malicious entity and a non-malicious entity or two non-malicious entities). Accordingly, calculating a relative minimum of the first term of Equation 2 generally (although not always) ensures that the feature analyzer 460 is calculating a relative minimum distance between two malicious entities from the subset $\hat{S}$ (i.e., s, t) with a high probability. In this manner, any unrelated non-malicious entities that were mistakenly included in the suspect entity set (e.g., due to a false report, erroneous analysis, etc.) are usually ignored.

On the other hand, the second term (i.e., $-\min_{\bar{s} \in \hat{S}, \bar{r} \in \hat{R}} d(\bar{s}, \bar{r}, \bar{w})$) of Equation 2 represents a relative minimum of all possible distances between given suspect entities and unclassified entities. In this example, a network (e.g., the first network 120) is assumed to be primarily comprised of non-malicious entities and any small subset of entities includes only non-malicious entities $\hat{R}$ with high probability. Accordingly, in calculating a negative relative minimum of the second term of Equation 2, the feature analyzer 460 determines a relative maximum distance between a suspect entity (e.g., s) and a closest non-malicious entity (e.g., r).

More specifically, by minimizing the second term of Equation 2, the feature analyzer 460 may focus around features suspected of indicating malicious activity and ignore non-malicious entities that have already been deemed to be relatively distant from suspected malicious entities.

In using the example Equation 2, the feature analyzer 460 does not analyze distances between unclassified entities (i.e., when none of the inputs to Equation 2 are suspected malicious entities), though, in some examples, the feature analyzer 460 may analyze a distance between unclassified entities in a similar manner as disclosed herein between malicious entities and/or between malicious entities and unclassified entities. In some examples, the feature analyzer 460 may use a regularization term to manipulate the distance function to favor identification of sparse solutions (i.e., a set of distinguishing features with non-zero weights and remaining weights for all other features equal to zero). For example, the feature analyzer 460 may use the following Equation 3, which includes a regularization term:

$$\tilde{L}(\hat{S}, \hat{R}, \overline{w}) = L(\hat{S}, \hat{R}, \overline{w}) + \gamma \sum_{i=1}^{k} |w_i| \quad \text{Equation 3}$$

wherein, $\gamma$ is a regularization coefficient (e.g., a constant, such as $10^{-4}$, or any other number).

In some examples, the weight adjuster 466 of the feature analyzer 466 adjusts the respective weights of the parameter vector $\overline{w}$ using a stochastic gradient descent method to reduce the computational complexity of an analysis (e.g., due to a large number entities, features, etc.). In such examples, rather than computing a gradient by using all samples of pairs of entities, a single sample pair or set of pairs (e.g., one or more pairs of malicious entities and one or more pairs of a malicious entity and an unclassified entity) is used to compute the gradient at each iteration of computation of the example Equation 2.

In some examples, to avoid trivial solutions during stochastic gradient descent (e.g., all weights being equal to zero, some being negative infinity, etc.), the example weight adjuster 466 sets the weights of the parameter vector $\overline{w}$ to be non-negative and a sum of the weights of the parameter vector $\overline{w}$ to be equal to 1, as formalized in Equation 4 below:

$$\sum_{i=1}^{k} w_i = 1, \text{ and } w_i \geq 0, \text{ for } i = 1, 2, \ldots, k \quad \text{Equation 4}$$

wherein i is representative of the features generated by the feature generator 440. In examples disclosed herein, a learning rate of the stochastic gradient descent may be $$n_i = \frac{n_0}{1 + i\gamma}$$

at the ith iteration, wherein $n_0$ a step size (e.g., $10^{-7}$) of a gradient descent algorithm and $\gamma$ is the regularization coefficient.

Example Algorithm 1 may be used to implement a stochastic gradient descent procedure:

| Algorithm 1 Projected Stochastic Gradient Descent |
|---|
| 1: w ← randomly initialize |
| 2: w ← ProjectOntoSimplex (w) |
| 3: for i = 1 to maxIter do |
| 4: $\quad \hat{S}$ ← getRandomSubset(S, $\theta_s$) |
| 5: $\quad \hat{R}$ ← getRandomSubset(R, $\theta_r$) |
| 6: $\quad$ w ← w − $\eta_i \nabla \tilde{L}(\hat{S}, \hat{R}, w)$ |
| 7: $\quad$ w ← ProjectOntoSimplex (w) |
| 8: end for |
| 9: return w | wherein, $\theta_S$ is a size of a suspect subset, $\theta_R$ is a size of a set of randomly selected entities to be analyzed, $n_i$ is the learning rate, $\gamma$ is the regularization coefficient, and wither corresponds to a number of iterations to calculate the distance function and adjust the weights $w_i$. The above example parameters may be set based on instructions from a user and/or may be set based on settings from the network controller 202 corresponding to the number of entities 130(A), 130(B), . . . , 130(N) and/or number of features identified from the network log records 301 for the network 120.

In some examples, a SoftMin function, which is a differentiable approximation of the min( ) function is used in coordination with the stochastic gradient descent. In such examples, the following example Equation 5 may be used:

$$SMin(x_1, x_2, \ldots, x_n, \beta) = \frac{\sum_{i=1}^{n} x_i e^{-\beta x_i}}{\sum_{i=1}^{n} e^{-\beta x_i}} \quad \text{Equation 5}$$

wherein, $\beta$ is a large parameter value (e.g., a value between 0.1 and 10). The example SoftMin function may be used to account for an inability to differentiate the min function of Equation 2.

In examples disclosed herein, the feature analyzer 460 may run several iterations of the example Algorithm 1 and/or may run example Algorithm 1 from different starting points (e.g., using different parameter values, learning rates, etc.). From there, the example feature analyzer 460 may identify a relative minimum distance from the calculated distance function, and weights of the distance function corresponding to statistical features that are indicative of malicious activity.

After several iterations (e.g., 10,000 iterations, 100,000 iterations, etc.) of the distance function calculated by the distance function calculator 464, with the weights being iteratively adjusted by the weight adjuster 466, the example malicious feature identifier 468 analyzes the determined final weight $\overline{w}_i^*$. The final weight $\overline{w}_i^*$ is a vector comprised of final weights $w_i^*$ indicating which of the features are indicative of malicious activity. In some examples, the greater the value that a final weight $w_i^*$ has, the more significance the final weight $w_i^*$ has in distinguishing malicious entities from other entities, and thus the more indicative that the corresponding feature is indicative of malicious activity. Thus, using the example above, if a final weight $w_1^*$ corresponding to the NUMBER OF RECORDS feature 602 is greater than a final weight $w_5^*$ (i.e., $w_1^* > w_5^*$) corresponding to the RECORDS/IN TCP feature 702, then the NUMBER OF RECORDS feature 602 is more indicative of malicious activity than the RECORDS/IN TCP feature 702. In other examples, other distance functions and/or weight adjustments may be used such that a lower final weight $w_i^*$ indicates a greater likelihood of malicious activity.

After the malicious feature identifier 468 determines the features indicative of malicious behavior based on the final weights $w_i^*$, the example feature analyzer 460 may relay these features and/or corresponding information to the network controller 202. In some examples, the network controller 202 may instruct network entities and/or network monitors (e.g., all network entities and/or network monitors) in the network 120 to prioritize feature analysis based on the identified features. Accordingly, malicious activity and/or malicious entities may be identified more quickly and/or efficiently using the log record analyzer 110 of FIG. 4. In some examples, the example network monitor 102 of FIG. 2 may identify an unclassified entity (e.g., one of the entities 130(A), 130(B), . . . , 130(N)) as malicious based on having similar feature values as a suspected malicious entity for a feature identified as indicative of malicious activity by the feature analyzer 260.

While an example manner of implementing the log record analyzer 110 of FIGS. 1 and/or 2 is illustrated in FIG. 4, one or more of the elements, processes and/or devices illustrated in FIG. 4 may be combined, divided, re-arranged, omitted, eliminated and/or implemented in any other way. Further, the example log record retriever 410, the example parser 420, the example record aggregator 430, the example feature generator 440, the example feature calculator 450, the example feature analyzer 460, including the example entity selector 462, the example distance function calculator 464, the example weight adjuster 466, and the malicious feature identifier 468, and/or, more generally, the example log record analyzer 110 of FIG. 4 may be implemented by hardware, software, firmware and/or any combination of hardware, software and/or firmware. Thus, for example, any of the example log record retriever 410, the example parser 420, the example record aggregator 430, the example feature generator 440, the example feature calculator 450, the example feature analyzer 460, including the example entity selector 462, the example distance function calculator 464, the example weight adjuster 466, and the malicious feature identifier 468, and/or, more generally, the example log record analyzer 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example log record retriever 410, the example parser 420, the example record aggregator 430, the example feature generator 440, the example feature calculator 450, the example feature analyzer 460, including the example entity selector 462, the example distance function calculator 464, the example weight adjuster 466, and the malicious feature identifier 468 is/are hereby expressly defined to include a tangible computer readable storage device or storage disk such as a memory, a digital versatile disk (DVD), a compact disk (CD), a Blu-ray disk, etc. storing the software and/or firmware. Further still, the example log record analyzer 110 of FIGS. 1 and/or 2 may include one or more elements, processes and/or devices in addition to, or instead of, those illustrated in FIG. 4, and/or may include more than one of any or all of the illustrated elements, processes and devices.

Figure 8:
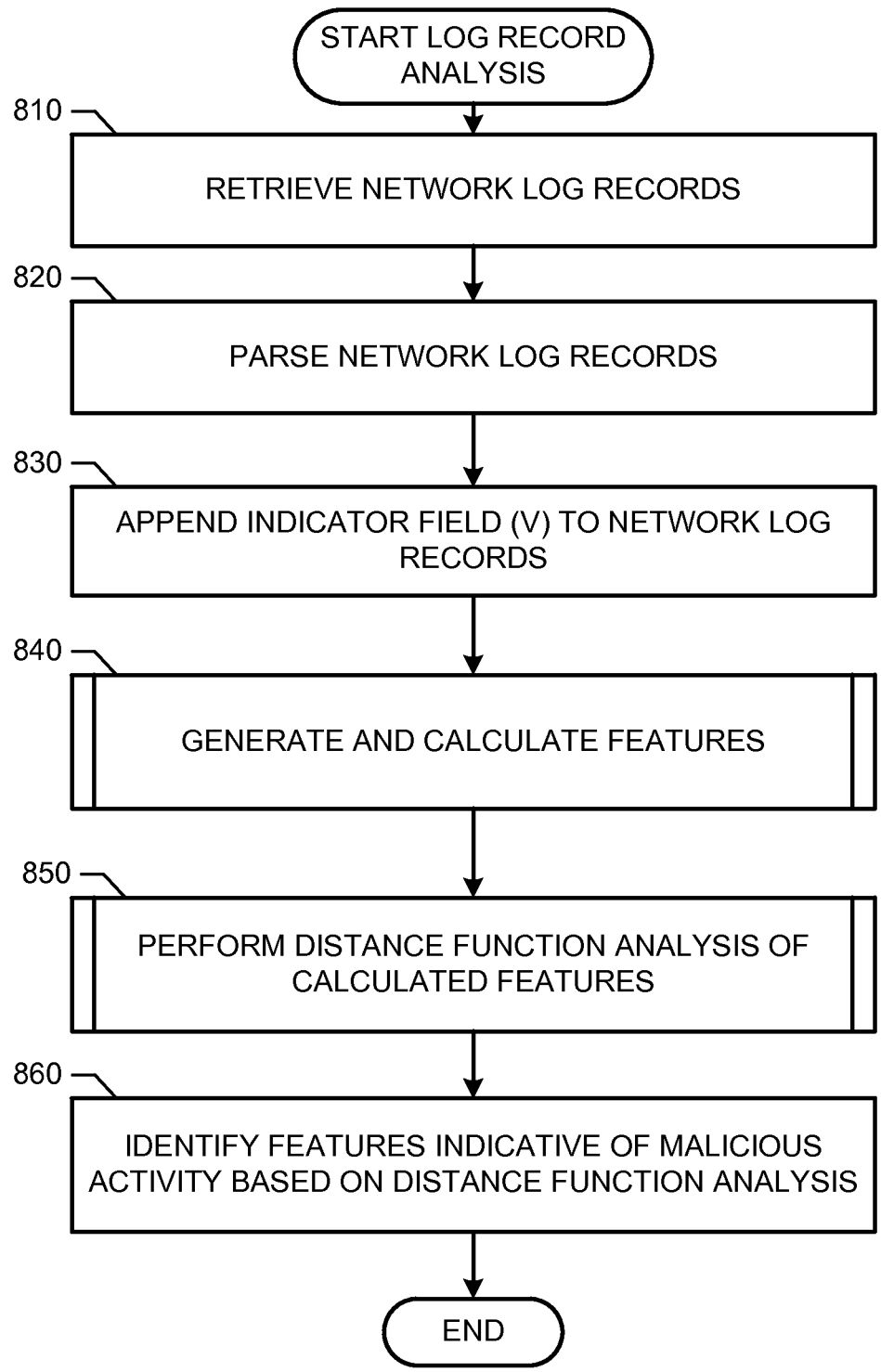
FIG. 8 is a flowchart representative of example machine readable instructions that may be executed to implement the log record analyzer of FIGS. 1, 2, and/or 4.
Figure 9:
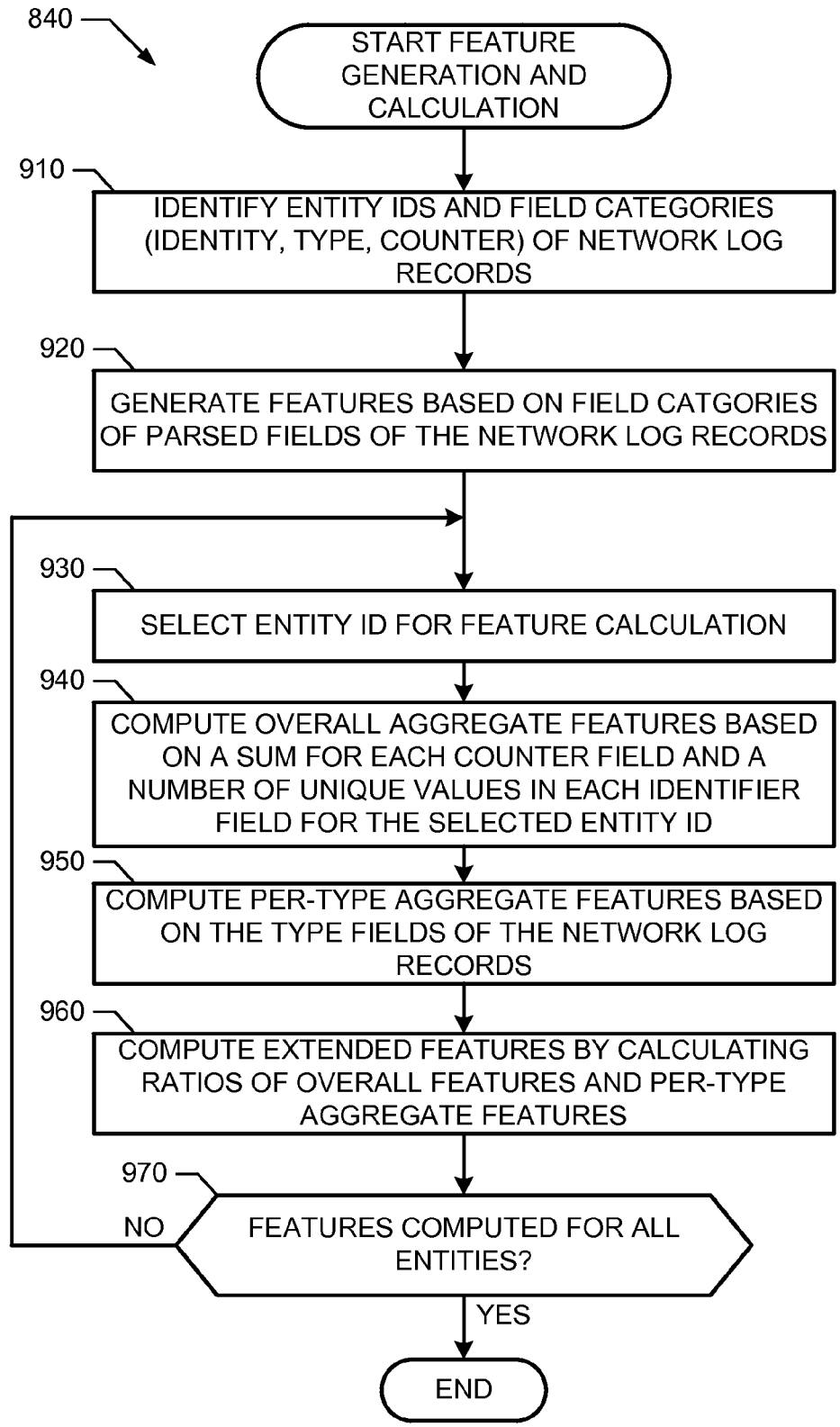
FIG. 9 is a flowchart representative of example machine readable instructions that may be executed to implement the log record analyzer of FIGS. 1, 2, and/or 4.

Flowcharts representative of example machine readable instructions for implementing the example log record analyzer 110 of FIGS. 1, 2, and/or 4 are shown in FIGS. 8, 9, and/or 10. In this example, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 8, 9, and/or 10, many other methods of implementing the example log record analyzer 110 may alternatively be used. For example, the order of execution of the blocks may be changed, and/or some of the blocks described may be changed, eliminated, or combined.

The example program 800 of FIG. 8 begins with an initiation of the log record analyzer 110 (e.g., via instructions from the network controller 202, in response to a user input, etc.). At block 810, the log record retriever 410 retrieves the network log records 301 from the log record database 250. At block 820, the parser 420 parses the network log records 300. At block 830, the example feature generator 440 appends a bit identifier (V) 303 to the network log records 301. In some examples, the bit identifier field 303 is assigned a value of one to enable a feature calculator 450 to calculate a number of records for a particular entity by summing the bit identifier field 303.

At block 840, as disclosed above and in further detail below in connection with FIG. 9, the record aggregator 430, the feature generator 440, and the feature calculator 450 generate and/or calculate features from the parsed network logs. At block 850, as disclosed above and in further detail below in connection with FIG. 10, the feature analyzer 460 performs a distance function analysis of the calculated features to identify features indicative of malicious activity. At block 860, the example feature analyzer 460 identifies features indicative of malicious activity based on the distance function analysis.

The program 840 of FIG. 9, which may be executed to implement block 840 of FIG. 8, begins at block 910 following parsing of the network log records 301. At block 910, the example record aggregator 430 identifies entity IDs (e.g., the Local IDs 302) and field categories (e.g., Identity, Type, Counter, etc.) of the network log records 301.

At block 920 of FIG. 9, the example feature generator 440 generates features based on field categories of the parsed fields of the network log records. In some examples, a plurality of features are generated in tiers. In such examples, the feature generator 440 generates a first example tier of overall aggregate features by identifying all counter fields (e.g., NUMBER OF RECORDS feature 602) and identity fields (e.g., NUMBER OF REMOTE IDs feature 608 of FIG. 6). The example feature generator 440 generates a second example tier of per-type aggregate features by identifying potential type combinations (e.g., incoming TCP, incoming UDP, outgoing TCP, outgoing UDP, etc.) for the first tier fields (e.g., the RECORDS/IN TCP 702, RECORDS/OUT TCP features 704, etc. of FIG. 7). The example feature generator 440 generates a third example tier of extended features by identifying combinations (e.g., ratios) of the overall aggregate features and the per-type aggregate features.

At block 930, the example feature calculator 450 selects an entity ID for feature calculation. Accordingly, at block 930, the feature calculator 450 begins calculating feature values for a particular entity. At block 940, the feature calculator 450 computes a sum of each counter field and computes a number of unique values in each identifier field (i.e., calculates values for the first tier of generated features) for the selected entity ID. At block 950, the example feature calculator 450 computes per-type aggregate features based on the type fields of the network log records 300 (i.e., calculates values for the second example tier of generated features). At block 960, the example feature calculator 450 computes extended feature values by calculating ratios of some or all of the overall features and/or the per-type aggregate features (i.e., calculates values for the third example tier of generated features).

At block 970 of FIG. 9, the log record analyzer 110 (e.g., via the example record aggregator 430, the example feature generator 440, and/or the example feature calculator 450) determines whether features values have been computed for all entities identified in the network log records 301. If, at block 970, all features have not been computed for all of the identified entities, control returns to block 930. If all features have been computed for all entities, the program 840 ends.

Figure 10:
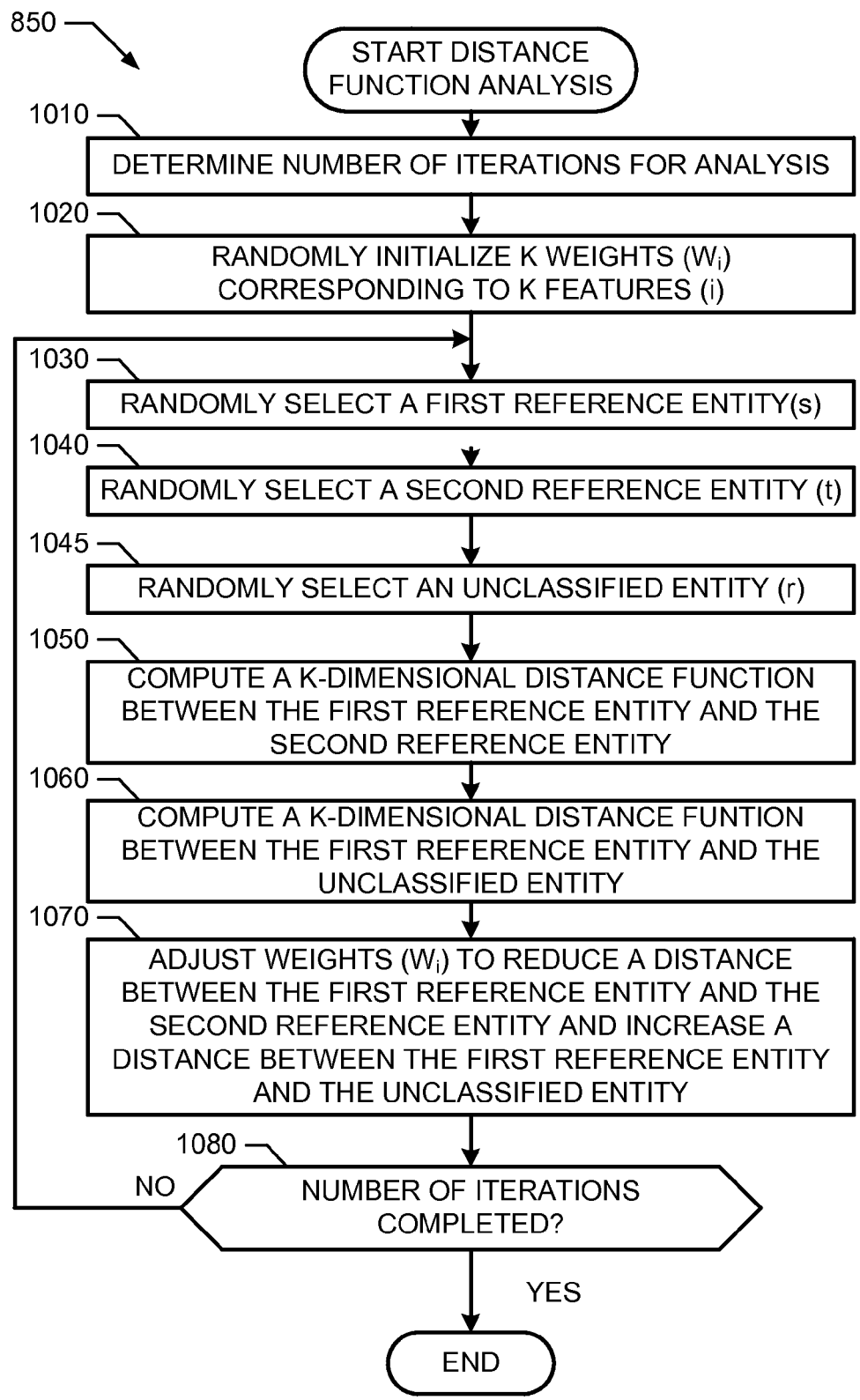
FIG. 10 is a flowchart representative of example machine readable instructions that may be executed to implement the log record analyzer of FIGS. 1, 2, and/or 4.

The program 850 of FIG. 10, which may be executed to implement block 850 of FIG. 8, begins at block 1010 following calculation of the features (e.g., the features 600, 700 and/or extended features from the features 600, 700 from FIGS. 6 and 7) from the network log records 301. At block 1010, the example feature analyzer 460 determines a number of iterations for the analysis of the features. In some examples, the feature analyzer 460 may retrieve the number of iterations from the network controller 202, and/or settings entered by a user. At block 1020, the example weight adjuster 466 randomly initializes (e.g., using a random number generator) k weights $w_i$ of the corresponding features for the distance calculation.

At block 1030 of FIG. 10, the example entity selector 462 randomly selects (e.g., using a random number generator) a first reference entity (e.g., a first entity suspected of being malicious (s)). In some examples, the entity selector 462 randomly selects the first reference entity from a list of malicious entities stored by the malicious entity tracker 208 (FIG. 2). At block 1040, the example entity selector 462 randomly selects a second reference entity (e.g., a second entity suspected of being malicious (t)). At block 1045, the example entity selector 462 randomly selects an unclassified entity (e.g., an unclassified entity (r)). At block 1050, the example distance function calculator 464 computes a k—dimensional distance function between the first reference entity (s) and the second reference entity (t) (e.g., the first term of Equation 2) corresponding to a difference between the feature values (or feature vector values) of the respective entities. At block 1060, the example distance function calculator 464 computes a k-dimensional distance function between the first reference entity (s) and the unclassified entity (r) (e.g., the second term of Equation 2).

At block 1070 of FIG. 10, the example weight adjuster 466 adjusts the values of the weights $w_i$ to reduce a distance between the first reference entity(s) and the second reference entity (t) and to increase a distance between the first reference entity (s) and the unclassified entity (r). In some examples, the example weight adjuster 466 uses a stochastic gradient descent algorithm to compute the adjusted values for the weights $w_i$. At block 1080, the feature analyzer 460 determines whether the number of determined iterations have been completed. If not all of the iterations have been completed, control returns to block 1030, and subsequent calculation and weight adjustment is performed. If all iterations have been completed, the program 850 ends, and the final weights $w_i^*$ have been learned (e.g., determined). As disclosed above in connection with FIG. 8, after execution of the program 850, the example malicious feature identifier 468 of the feature analyzer 460 identifies the features that are indicative of malicious activity (block 860 of FIG. 8). In some examples, the program 850 is repeated multiple times for the network log records 301 to identify the features (e.g., the features 600, 700 of FIGS. 6 and/or 7 and corresponding example extended features, etc.) that are indicative of malicious activity.

Figure 11:
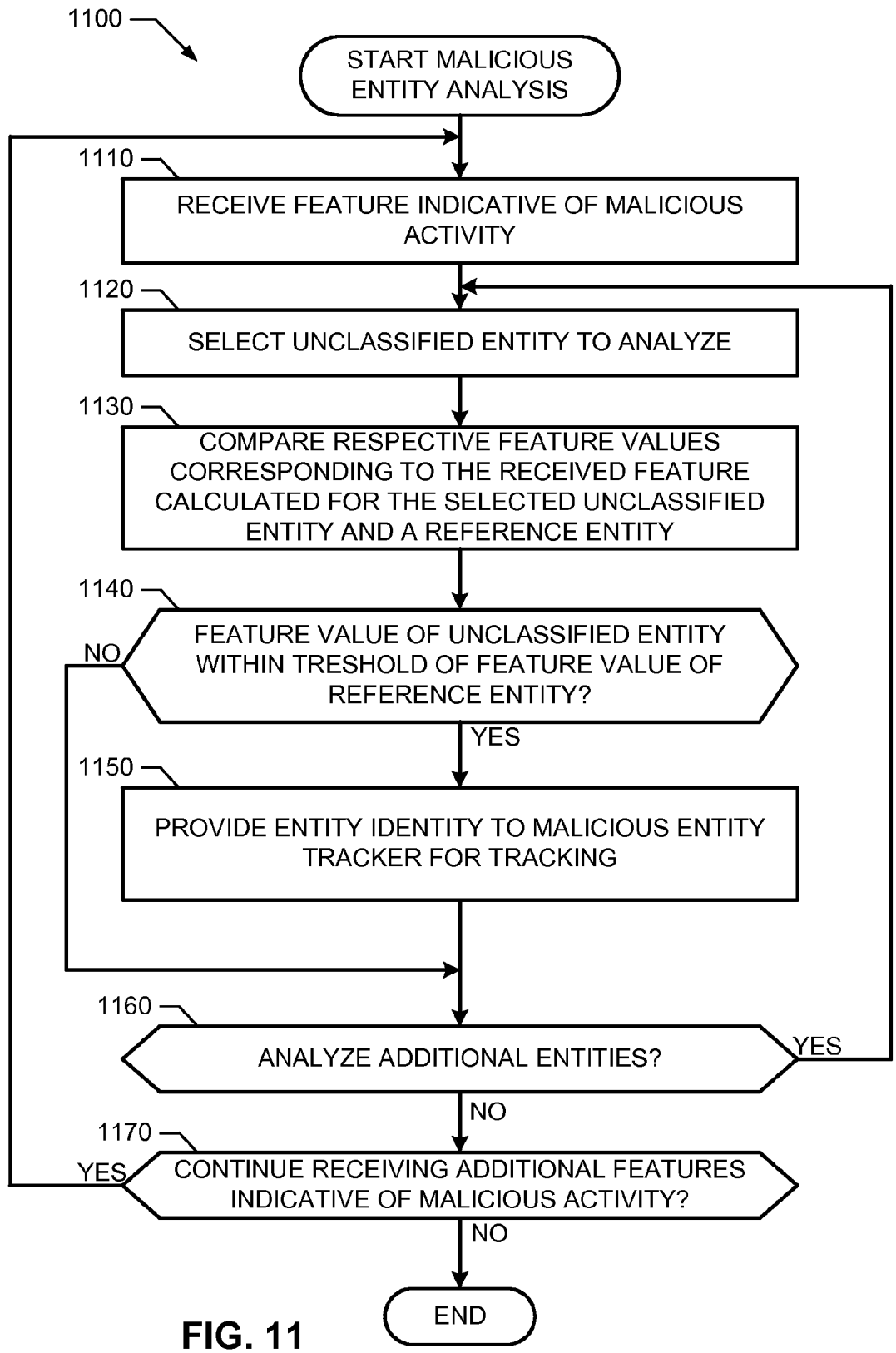
FIG. 11 is a flowchart representative of example machine readable instructions that may be executed to implement the example network controller of the example network monitor of FIGS. 1 and/or 2.

A flowchart representative of example machine readable instructions for implementing the example network controller of FIG. 2 is shown in FIG. 11. In this example, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIG. 11, many other methods of implementing the example network controller 202 may alternatively be used. For example, the order of execution of the blocks may be changed, and/or some of the blocks described may be changed, eliminated, or combined.

The example program 1100 of FIG. 11 begins in response to the example feature analyzer 460 providing the network controller 202 with features that are indicative of malicious activity. At block 1110, the network controller 202 receives a feature indicative of malicious activity from the example feature analyzer 460. At block 1120, the network controller 202 selects an unclassified entity (e.g., from a list of unclassified entities identified by the record aggregator 430). At block 1130, the network controller 202 compares respective feature values corresponding to the feature indicative of malicious activity and calculated by the feature calculator 450 for the selected entity and a reference entity (e.g., an entity tracked by the malicious entity tracker 208). At block 1140, the network controller 202 determines whether the feature value calculated for the unclassified entity is within a threshold distance of the feature value calculated for the reference entity. If, at block 1140, the example feature value calculated for the unclassified entity is within a threshold (e.g., within a percentage value, such as 20%), the network controller 202, at block 1150, instructs the malicious entity tracker 208 to store an identifier of the previously unclassified entity as malicious. If, at block 1140, the example feature value calculated for the unclassified entity is not within a threshold, the entity remains unclassified and control advances to block 1160. In such examples, though the entity is considered to be non-malicious, it may later become malicious, and therefore, is considered unclassified.

At block 1160, the example network controller 202 determines whether more entities are to be analyzed. If more entities are to be analyzed, control returns to block 1120. If no more entities are to be analyzed, at block 1170, the network controller 202 determines whether to continue receiving additional features that are indicative of malicious activity from the feature analyzer 460. If the network controller 202 is to continue receiving features indicative of malicious activity, control returns to block 1110. If the network controller 202 is not to continue receiving features indicative of malicious activity, the program 1100 ends.

Figure 12:
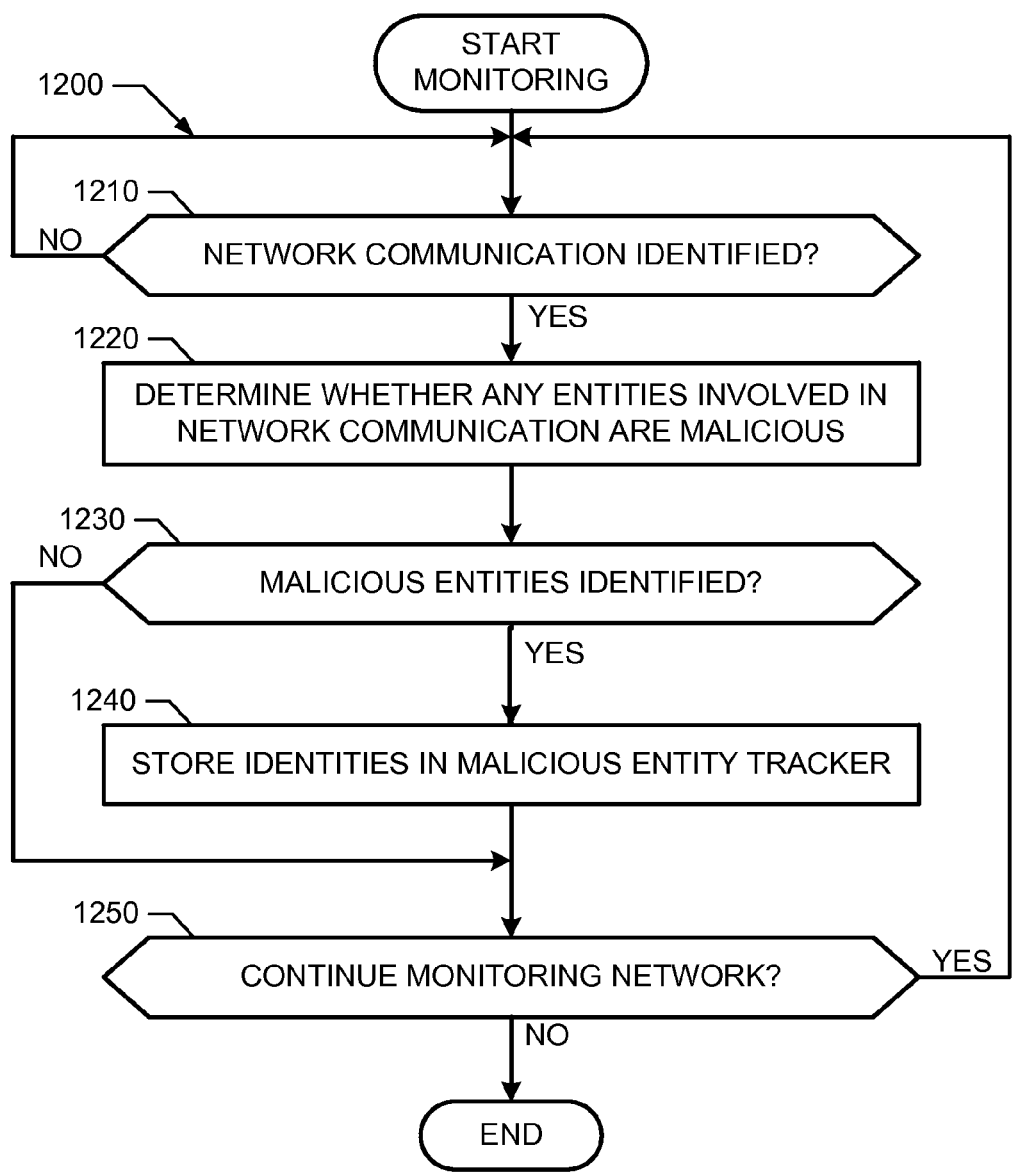
FIG. 12 is a flowchart representative of example machine readable instructions that may be executed to implement the example network monitor of FIGS. 1 and/or 2.

A flowchart representative of example machine readable instructions for implementing the network monitor 102 of FIGS. 1 and/or 2 is shown in FIG. 12. In this example, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIG. 12, many other methods of implementing the example network monitor 102 may alternatively be used. For example, the order of execution of the blocks may be changed, and/or some of the blocks described may be changed, eliminated, or combined.

The example program 1200 of FIG. 12 begins in response to an initiation of the network monitor 102 of FIGS. 1 and/or 2 to monitor a network (e.g., via instructions from a user, upon startup, etc.). At block 1210, the example network monitor 102 determines whether a network communication has occurred (e.g., an interaction through the network monitor 102, through a router, edge router, switch, etc. associated with the network monitor 102, etc.). If no network communication that is to be monitored has occurred, the network monitor 102 continues monitoring for network communications. When a network communication that is to be monitored is identified, at block 1220, the network controller 202 determines whether entities involved in the network communication are malicious. For example, the network controller 202 may compare the entity IDs to a public blacklist of identified malicious entities, a list of entities reported as malicious from other entities, etc. In some examples, the network controller 202 compares the entities to entities stored in the malicious entity tracker 208 to determine whether the entities are malicious. If one or more of the entities in the network communication are identified as malicious (block 1230), the identities of the entities in the network communication are stored in the malicious entity tracker 208. In such examples, any entities identified network communication are tracked in the malicious entity tracker 208 malicious entities based on communication with a malicious entity. In some examples, only the identified malicious entity is tracked in the malicious entity tracker 208. If, at block 1230, none of the entities in the network communication are identified as malicious control advances to block 1250.

At block 1250 of FIG. 12, the example network monitor 102 determines whether to continue monitoring the network. If the network monitor 102 is to continue monitoring the network, control returns to block 120 to monitor for network communications. If the network monitor 102 is not to continue monitoring the network, the program 1200 ends.

As mentioned above, the example processes of FIGS. 8, 9, 10, 11, and/or 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8, 9, 10, 11, and/or 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 13:
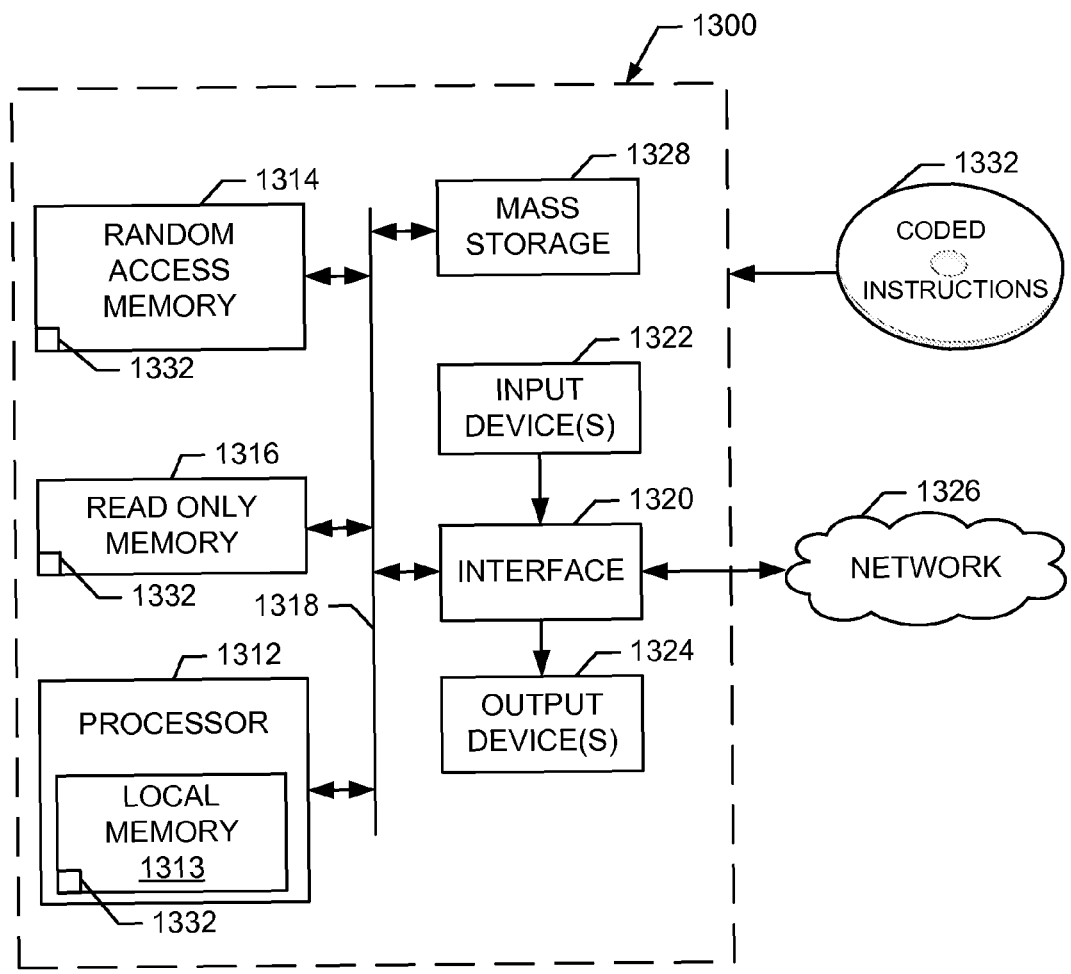
FIG. 13 is a block diagram of an example processor platform to execute the instructions of FIGS. 8, 9, 10, 11, and/or 12 to implement the example network monitor and/or the example log record analyzer of FIGS. 1, 2, and/or 4.

FIG. 13 is a block diagram of an example processor platform 1300 capable of executing the instructions of FIGS. 8, 9, 10, 11, and/or 12 to implement the network monitor and/or the log record analyzer 110 of FIGS. 1, 2, and/or 4. The processor platform 1300 can be, for example, a server, a personal computer, a mobile device (e.g., a cell phone, a smart phone, a tablet such as an iPad™), a personal digital assistant (PDA), an Internet appliance, a digital video recorder, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 8, 9, 10, 11, and/or 12 may be stored in the mass storage device 1328, in the volatile memory 1314, in the non-volatile memory 1316, and/or on a removable tangible computer readable storage medium such as a CD or DVD.

From the foregoing, it will be appreciated that methods, apparatus and articles of manufacture disclosed herein enable automatically learning distinguishing features representative of malicious activity of malicious entities from network log records. Example methods disclosed herein enable efficient identification of previously unidentified malicious entities by identifying specific features (or types of network activities) that may be monitored and/or analyzed for malicious activity and prioritizing an analysis of the specific features over other identified features. Furthermore, example methods and examples herein provide an initial understanding of an underlying malicious activity. For example, a particular type of network protocol may be primarily used for a particular malicious activity, and thus other protocols may not need to be analyzed to detect the malicious activity.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   generating, with a processor, a set of statistical features based on communications between a plurality of network devices including a set of suspect devices classified as being associated with malicious activity and a set of unclassified devices;
   iteratively adjusting, with the processor and for a first number of iterations, a set of weights of a distance function representing differences between vectors of statistical features for different devices, the weights corresponding to the statistical features, the set of weights to be adjusted at each iteration based on a calculated gradient and step size to (1) reduce a first distance calculated between a first suspect device of the set of suspect devices and a second suspect device of the set of suspect devices and (2) increase a second distance calculated between the first suspect device and a first unclassified device of the set of unclassified devices; and
   in response to determining a first statistical feature of the set of statistical features is indicative of malicious activity based on a corresponding first weight, sending information identifying the first statistical feature of the set of statistical features to a network monitor that is to determine whether any of the unclassified devices are associated with malicious activity.

2. The method according to claim 1, wherein generating the set of statistical features based on the communications includes:
   parsing network log records into fields based on communication information in the network logs;
   determining categories of the fields based on the communication information in the respective fields; and
   generating the statistical features from the network log records based on the categories of the fields.

3. The method according to claim 2, wherein generating the set of statistical features based on the communications further includes:
   generating a first tier of statistical features from a first set of the fields identified as storing counter information and a second set of the fields identified as storing identity information;
   generating a second tier of statistical features from the first tier of statistical features and a third set of fields identified as storing communication type information; and
   generating a third tier of statistical features from the first tier of statistical features and the second tier of statistical features by generating ratios of respective pairs of statistical features from the first and second tiers of statistical features.

4. The method according to claim 1, wherein the first statistical feature is determined to be indicative of malicious activity if, after adjusting the weights, the corresponding first weight has a value greater than a second weight corresponding to a second statistical feature.

5. The method according to claim 1, further including identifying a second unclassified device of the set of unclassified devices as being associated with malicious activity based on the first statistical feature.

6. The method according to claim 5, wherein identifying the second unclassified device as being associated with malicious activity further includes:
   comparing a first respective value of the first statistical feature generated for the second unclassified device to a second respective value of the first statistical feature generated for a third suspect device of the set of suspect devices; and
   determining the second unclassified device is malicious if the first respective value of the first statistical feature generated for the second unclassified device is within a threshold value of the second respective value of the first statistical feature generated for a third suspect device.

7. An apparatus comprising:
   a memory to store machine readable instructions; and
   a processor to execute the instructions to perform operations including:

generating a set of statistical features based on communications between a plurality of network devices including a set of suspect devices classified as being associated with malicious activity and a set of unclassified devices;

iteratively adjusting, for a first number of iterations, a set of weights of a distance function representing differences between vectors of statistical features for different devices, the weights corresponding to the statistical features, the set of weights to be adjusted at each iteration based on a calculated gradient and step size to (1) reduce a first distance calculated between a first suspect device of the set of suspect devices and a second suspect device of the set of suspect devices and (2) increase a second distance calculated between the first suspect device and a first unclassified device of the set of unclassified devices; and in response to determining a first statistical feature of the set of statistical features is indicative of malicious activity based on a corresponding first weight, sending information identifying a first statistical feature of the set of statistical features to a network monitor that is to determine whether any of the unclassified devices are associated with malicious activity.

8. The apparatus according to claim 7, wherein generating the set of statistical features based on the communications includes:
parsing network log records into fields based on communication information in the network logs;
determining categories of the fields based on the communication information in the respective fields; and
generating the statistical features from the network log records based on the categories of the fields.

9. The apparatus according to claim 8, wherein generating the set of statistical features based on the communications further includes:
generating a first tier of statistical features from a first set of the fields identified as storing counter information and a second set of the fields identified as storing identity information,
generating a second tier of statistical features from the first tier of statistical features and a third set of fields identified as storing communication type information; and
generating a third tier of statistical features from the first tier of statistical features and the second tier of statistical features by generating ratios of respective pairs of statistical features from the first and second tiers of statistical features.

10. The apparatus according to claim 7, wherein the first statistical feature is determined to be indicative of malicious activity if, after adjusting the weights, the respective adjusted corresponding first weight has a value greater than a second respective adjusted weight corresponding to a second statistical feature.

11. The apparatus according to claim 7, wherein the operations further include identifying a second unclassified device of the set of unclassified devices as being associated with malicious activity based on the first statistical feature.

12. The apparatus according to claim 7, wherein the operations identifying the second unclassified device as being associated with malicious activity further includes:
comparing a first respective value of the first statistical feature generated for the second unclassified device to a second respective value of the first statistical feature generated for the third suspect device of the set of suspect devices; and determining the second unclassified device is malicious if the first respective value of the first statistical feature generated for the second unclassified device is within a threshold value of the second respective value of the first statistical feature generated for a third suspect device.

13. A tangible machine readable storage medium including instructions which, when executed, cause a machine to perform operations comprising:
generating a set of statistical features based on communications between a plurality of network devices including a set of suspect devices classified as being associated with malicious activity and a set of unclassified devices;
iteratively adjusting, for a first number of iterations, a set of weights of a distance function representing differences between vectors of statistical features for different devices, the weights corresponding to the statistical features, the set of weights to be adjusted at each iteration based on a calculated gradient and step size to (1) reduce a first distance calculated between a first suspect device of the set of suspect devices and a second suspect device of the set of suspect devices and (2) an increase a second distance calculated between the first suspect device and a first unclassified device of the set of unclassified devices; and
in response to determining a first statistical feature of the set of statistical features is indicative of malicious activity based on a corresponding first weight, sending information identifying a first statistical feature of a set of statistical features to a network monitor that is to determine whether any of the unclassified devices are associated with malicious activity.

14. The storage medium according to claim 13, wherein generating the set of statistical features based on the communications includes:
parsing network log records into fields based on communication information in the network logs;
determining categories of the fields based on the communication information in the respective fields; and
generating the statistical features from the network log records based on the categories of the fields.

15. The storage medium according to claim 14, wherein generating the set of statistical features based on the communications further includes:
generating a first tier of statistical features from a first set of the fields identified as storing counter information and a second set of the fields identified as storing identity information,
generating a second tier of statistical features from the first tier of statistical features and a third set of fields identified as storing communication type information; and
generating a third tier of statistical features from the first tier of statistical features and the second tier of statistical features by generating ratios of respective pairs of statistical features from the first and second tiers of statistical features.

16. The storage medium according to claim 13, wherein the first statistical feature is determined to be indicative of malicious activity if, after adjusting the weights, the corresponding first weight has a value greater than a second weight corresponding to a second statistical feature.

17. The storage medium according to claim 13, wherein the operations further include identifying a second unclassified device of the set of unclassified devices as being associated with malicious activity based on the first statistical feature.

18. The storage medium according to claim 17, wherein identifying the second unclassified device as being associated with malicious activity further includes:
  comparing a first respective value of the first statistical feature generated for the second unclassified device to a second respective value of the first statistical feature generated for a third suspect device of the set of suspect devices; and
  determining the second unclassified device is malicious if the first respective value of the first statistical feature generated for the second unclassified device is within a threshold value of the second respective value of the first statistical feature generated for a third suspect device.

* * * * *